US006764801B2

(12) United States Patent
Meyer

(10) Patent No.: US 6,764,801 B2
(45) Date of Patent: Jul. 20, 2004

(54) PROCESS FOR MAKING TONER

(75) Inventor: Robert J. Meyer, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 105 days.

(21) Appl. No.: 10/123,025

(22) Filed: Apr. 12, 2002

(65) Prior Publication Data

US 2002/0155370 A1 Oct. 24, 2002

Related U.S. Application Data

(63) Continuation-in-part of application No. 09/699,939, filed on Oct. 30, 2000, now abandoned.

(51) Int. Cl.$^7$ ................................................ C08J 3/215
(52) U.S. Cl. .................................. 430/137.14; 523/300
(58) Field of Search ............................ 430/137.14, 109; 523/300, 335

(56) References Cited

U.S. PATENT DOCUMENTS

| | | | |
|---|---|---|---|
| 5,004,165 A | 4/1991 | Landa et al. | 241/21 |
| 5,048,762 A | 9/1991 | Landa et al. | 241/21 |
| 5,078,504 A | 1/1992 | Landa et al. | 366/118 |
| 5,223,368 A | 6/1993 | Ciccarelli et al. | 430/110 |
| 5,482,812 A | 1/1996 | Hopper et al. | 430/137 |
| 5,492,788 A | 2/1996 | Denton et al. | 430/137 |

OTHER PUBLICATIONS

Meyer et al.; "Process and Apparatus for Obtaining Ink Dispersion by Subjecting the Liquid Inks to an Ultrasonic or Sonic Signal," U.S. patent application Ser. No. 09/699,703.
Meyer et al., "Method for Improving Oil Recovery Using an Ultrasound Technique," U.S. patent application Ser. No. 09/699,862.
Meyer et al., "A Method for Removing Trapped Impurity Aggregates from a Filter," U.S. patent application Ser. No. 09/699,871.
Meyer, "Ultrasonic Cleaner and Toner Agglomerate Disperser for Liquid Ink Development (LID) Systems Using Second Sound," U.S. patent application Ser. No. 09/699,882.
Meyer et al., "Method for Dispersing Red and White Blood Cells," U.S. patent application Ser. No. 09/699,804.
Meyer, "Ultrasonic Drying of Saturated Porous Solids via Second Sound," U.S. patent application Ser. No. 09/699,876.
M.A. Biot, "Theory of Propagation of Elastic Waves in a Fluid–Saturated Porous Solid. I. Low–Frequency Range," *Journal of the Acoustical Society of America*, vol. 28, Mar. 1956, pp. 168–178.
M.A. Biot, "Theory of Propagation of Elastic Waves in a Fluid–Saturated Porous Solid. II. Higher Frequency Range," *Journal of the Acoustical Society of America*, vol. 28, Mar. 1956, pp. 179–191.
M.A. Biot, "Mechanics of Deformation and Acoustic Propagation in Porous Media," *Journal of Applied Physics*, vol. 33, Apr. 1962, pp. 1482–1498.
D.L. Johnson, T.J. Plona and H. Kojima, "Probing Porous Media with First and Second Sound. II. Acoustic Properties of Water–Saturated Porous Media," *J. Appl. Phys.*, vol. 76 (1), Jul. 1994, pp. 115–125.
T.J. Plona, R. D'Angelo and D.L. Johnson, "Velocity and Attentuation of Fast, Shear and Slow Waves in Porous Media," *IEEE 1990 Ultasonics Symposium*, vol. 3, Dec. 4–7, 1990, pp. 1233–1239.
S. Torquato, "Random Heterogeneous Media: Microstructure and Improved Bounds on Effective Properties," *Appl Mech Rev.*, vol. 44, Feb. 1991, pp. 37–76.
J.E. White, "Seismic Waves: Radiation, Transmission and Attenuation," *McGraw–Hill, Inc.*, 1965, pp. 70–71.
W.A. Gray, "The Packing of Solid Particles," *Chapman and Hall Ltd.*, 1968, pp. 32–36.

Primary Examiner—John L Goodrow
(74) Attorney, Agent, or Firm—Lloyd F. Bean, II

(57) ABSTRACT

A printing machine for recording an image on a recording medium with marking particles, wherein process of making marking particles includes a method for dispersing pigment aggregates in a solution. The method employs an ultrasonic device to efficiently breakup particle agglomerates by driving the ultrasonic signal over a small range of frequencies around the acoustic slow wave frequency of the saturated agglomerate. At this frequency, the fluid vibrates out of phase with the solid and is forced out through the pore structure in the agglomerate. This relative fluid motion to exert high viscous stresses at the particle-particle contact points which leads to fracture of the agglomerate.

19 Claims, 10 Drawing Sheets

FIG. 6

PROCESS FOR MAKING TONER

This application is a continuation-in-part of U.S. patent application Ser. No. 09/699,939, filed Oct. 30, 2000 now abandoned.

This invention is generally directed to a method and apparatus for dispersal of aggregates in a fluid medium. The present invention employs a sonic or ultrasonic device to efficiently breakup particle agglomerates by driving the ultrasonic signal over a small range of frequencies around the acoustic slow wave frequency of the saturated agglomerate. At this frequency, the fluid vibrates out of phase with the solid and is forced out through the pore structure in the agglomerate, exerting stresses on the aggregate frame which cause breakup.

BACKGROUND OF THE INVENTION

Cross reference is made to the following applications filed on Oct. 30, 2000: U.S. Ser. No. 09/699,703 entitled "Process And Apparatus For Obtaining Ink Dispersing By Subjecting The Liquid Inks To An Ultrasonic Or Sonic Signal", U.S. Ser. No. 09/699,862 entitled "Method For Improving Oil Recovery Using An Ultrasound Technique", U.S. Ser. No. 09/699,871 entitled "A Method For Removing Trapped Impurity Aggregates From A Filter", U.S. Ser. No. 09/699,882 entitled "Ultrasonic Cleaner And Toner Agglomerate Disperser For Liquid Ink Development (LID) Systems Using Second Sound", U.S. Ser. No. 09/699,804 entitled "Method For Dispersing Red And White Blood Cells", and U.S. Ser. No. 09/699,876 entitled "Ultrasonic Drying of Saturated Porous Solids Via Second Sound".

Liquid electrostatic developers having chargeable toner particles dispersed in an insulating nonpolar liquid are well known in the art and are used to develop latent electrostatic images. Ideally, such liquid developers should be replenishable in the particular equipment in which they are used. In general, high solids concentration toners are used for replenishment because relatively low concentrations (e.g., in the range of 10 to 15% by weight solids) result in greater liquid build-up in the equipment, which then must be removed and disposed of as hazardous waste. Thus, it is desirable to initially use a toner containing less liquid, and to maintain the working source located within the equipment, thereby minimizing the undesirable accumulation of carrier liquid in the equipment. When toners are present in the liquid developer in more concentrated form, however, they become difficult to redisperse in the carrier. For example, aggregates may be formed. This can cause serious problems in the replenishment of the liquid developer in the equipment being use. It has been known to use high shear forces between two closely spaced cylindrical surfaces to dissociate liquid toner particles as disclosed in U.S. Pat. Nos. 5,004,165, 5,048,762, 5,078,504, and 5,492,788.

In printing applications these aggregation effects result in grainy images, poor coating uniformity, and poor image to image uniformity and image quality. Breaking up aggregates will result in better image quality. Dispersed particles in inks are subject to many effects that lead to coagulation, limiting shelf life. The liquid-based inks (LID, CEP, and any liquid-based dispersion of small particles) tend to coagulate if left on the shelf for long periods before use. Particles tend to settle under the influence of gravity, producing a sludge layer at the bottom of the container. Brownian motion of the particles due to thermal effects tends to bring particles into contact with one another, leading to coagulation and settling. Charge variations, especially in systems having both sign particles, leads to settling of ink particles. Therefore, it is desirable to have a method and apparatus to readily disperse the particles.

It is desirable to have a method and apparatus to obtain good color saturation. It is known that the color saturation, or chroma level, that can be achieved by color toners consisting of color pigments dispersed in a transparent binder is influenced to a large degree by the completeness of the dispersion of the pigments. Aggregated pigments tend to produce toners with washed-out or less bright colors than those achieved with well-dispersed pigments. On the other hand, it is difficult to achieve good dispersion with color pigments. This is due to the strong van der Waals forces that exist between these pigments, leading to strong, hard to disperse, aggregates.

The number of color pigments that can be used in the manufacture of EA toner is severely limited. In many cases one is forced to use pigments that have unwanted optical absorptions (i.e., absorb light at frequencies we don't want), giving colors that aren't exactly what we want, because we can disperse these pigments with the techniques at hand (e.g., sonicators, microfluidizers, Brinkman Polytrons are cited for example in U.S. Pat. No. 5,482,812 to Hopper et al. patent). There are many other pigments we would like to use, either for general application because their absorption spectrum is more in line with the color we want, or for custom purposes (e.g., to match the specific colors desired for a specific account: Kodak orange, John Deere green, etc.). Indeed, the color gamut of our copiers and printers is limited, not by the optical properties of the pigments available, but by the available pigments we can disperse. For example, there are 13 commonly available blue pigments, of which we typically use 1; there are 30 commonly available yellow pigments, of which we typically use 4; and there are 62 commonly available red pigments, or which we typically use 2. The other pigments are not used for several reasons. There may be health problems associated with their use; there may be problems associated with their effects on toner charging or tribo. However, these are not the primary characteristic that limits pigment use. Pigments are primarily rejected because their high adhesion characteristics make them too hard to disperse.

As noted above, pigment particles are found to be especially hard to disperse due to strong adhesion forces between the particles. This turns out to be a fundamental result of their bright color. The vivid color is a result of strong light absorption over a frequency band, i.e., a high imaginary part of the dielectric constant over a range of frequencies. The Lifshitz theory of van der Waals forces (discussed in Abrikosov, Gorkov, and Dzaloshinski, Methods of Quantum Field Theory in Statistical Physics) shows that the strength of the force between two bodies 1 and 2 is proportional to:

$$F_{vdW} \propto \int d\omega_1 \int d\omega_2 [Im(\in(\omega_1))Im(\in(\omega_2))/(\omega_1+\omega_2)]d\omega_1 d\omega_2. \quad (1)$$

where $Im(\in(\omega_1))$ is the imaginary part of the frequency-dependant dielectric constant of pigment particle i, and $\omega=2\pi f$, and f is the frequency of light. The term $Im(\in(\omega_1))$ is the term that gives absorption of light at certain frequencies, resulting in color. Thus, colorful materials which have high $Im(\in(\omega_1))$, such as pigments, also tend to be sticky materials because of their high van der Waals forces, as indicated via Eq. (1). As a result, all color pigments tend to be especially difficult to disperse by their very nature.

A somewhat older model of van der Waals forces is due to London (1930). While this model is not as accurate as the Lifshitz (1955) model (mentioned above), it can readily be used to predict pigment-pigment cohesion, and it's predictions are generally in agreement with experimental trends. In this model the van der Waals force between two bodies is proportional to the atomic polarizability per unit volume of each of the constituent elements. Polarizability per unit volume is a dimensionless number, independent of the unit system utilized. A simple model that accounts for many of the van der Waals adhesion properties of pigments is obtained by assigning a unique atomic polarizability to each element, regardless of the type of its molecular bonding in a compound. These polarizabilities can be obtained from published tables, or via simple least squares fitting procedures using published tables of molecular polarizabilities (CRC Handbook of Chemistry and Physics, 80th Edition). Similarly, elemental atomic volumes can be obtained from published tables, or via fitting to published pigment densities (NPIRI Raw Materials Data Handbook, vol. 4, Pigments). From this analysis we can make predictions of the relative strength of van der Waals cohesion between pigment particles. The van der Waals cohesion force should scale as the square of the molecular polarizability per unit volume.

An example of the difficulty of dispersing color pigments occurs in the selection of blue pigments. The blue (actually cyan) pigment most commonly used in making color toners is C. I. Pigment 15:3, also known as Phthalo Blue A, or phthalocyanine. This pigment has a strong reflection peak at approximately 460 nm. Unfortunately, this material also has a second reflection peak at 670 nm, giving rise to some unwanted reddish tinge. A second color pigment, lacking this secondary reflectance peak in the red, is C. I. Pigment Blue 27, also known as Ferriferrocyanide, Milori Blue, Iron Blue, Bronze Blue, Prussion Blue, or Chinese Blue. This is an economical pigment of outstanding tinting strength, good brightness, and full-tone lightfastness. Unfortunately, due to the presence of two high-polarizability iron atoms in its molecular structure, this pigment is much more difficult to disperse. Indeed, based on the model described above, Blue 27 is predicted to be the most difficult of the blue pigments to disperse, with a cohesive force approximately three times that of Blue 15:3. Blue 15:3 is the most cohesive pigment that has been dispersed by conventional methods (e.g., sonication). As a result, Blue 27 has not been used in EA toners, although it is used in other commercial applications where other dispersion aids such as surfactants are not a problem.

Ultrasonic waves are often utilized in an attempt to break up particle aggregates, including color pigments. However, this is not usually very successful because the forces acting to break up aggregates occur over the length scale of ½ of the wavelength of the sound, the distance between local maxima and minima in the sound pressure wave. This distance is typically on the order of millimeters. On the other hand, pigment particle sizes are typically on the order of 100–800 nm, and their aggregates on the order of 0.3–1 microns, much smaller than the sizes that can be broken up by usual ultrasound techniques. These usual techniques are basically useless for the degree of pigment particle dispersion required for good chroma levels.

A need to provide a less expensive and non-chemical method for dispersing pigments to obtain good chroma levels still remains.

SUMMARY OF THE INVENTION

An aspect of the invention is to provide a method and an apparatus for dispersing aggregates in a fluid medium. The present invention employs an ultrasonic device to efficiently breakup particle agglomerates by driving the ultrasonic signal over a small range of frequencies around the acoustic slow wave frequency of the saturated agglomerate. At this frequency, the fluid vibrates out of phase with the solid and is forced through the pore structure in the agglomerate. This relative motion of fluid and solid exerts high viscous stresses at the particle-particle contact points, which leads to fracture of the agglomerate.

In another object of the present invention there are provided simple and economical methods for making toner including the steps of: dispersing pigment aggregates and wax in a solution of particle latex constituents; emulsifying the solution; blending the solution; aggregating and coalescing the solution to form toner particles; subjecting the solution to an acoustic slow wave frequency to cause pore fluid motion within pigment aggregates thereby breaking up pigment aggregates in the solution, said subjecting step is applied during one or more of said steps of: said dispersing, emulsifying, blending or aggregating; washing the toner particles; and drying the toner particles; wherein said subjecting step includes the step of: determining the acoustic slow wave frequency; and wherein said determining step includes calculating said acoustic slow wave frequency from the following equation:

$$f_c = \eta \{S_v^2(1-\phi)^2\}/(2\pi B\phi^2 \rho_f)$$

Where $f_c$ is the acoustic slow wave frequency, $\eta$ is the solution viscosity, $S_v$ is the primary pigment surface area per unit volume of the aggregates, $\phi$ is the pigment aggregates porosity, $\rho_f$ is the solution density, and B is a constant.

BRIEF DESCRIPTION OF THE DRAWINGS

The accompanying

FIGS. 5 and 6 are illustrative graphs showing power absorption spectrum.

DETAILED DESCRIPTION OF THE INVENTION

Figure 1:
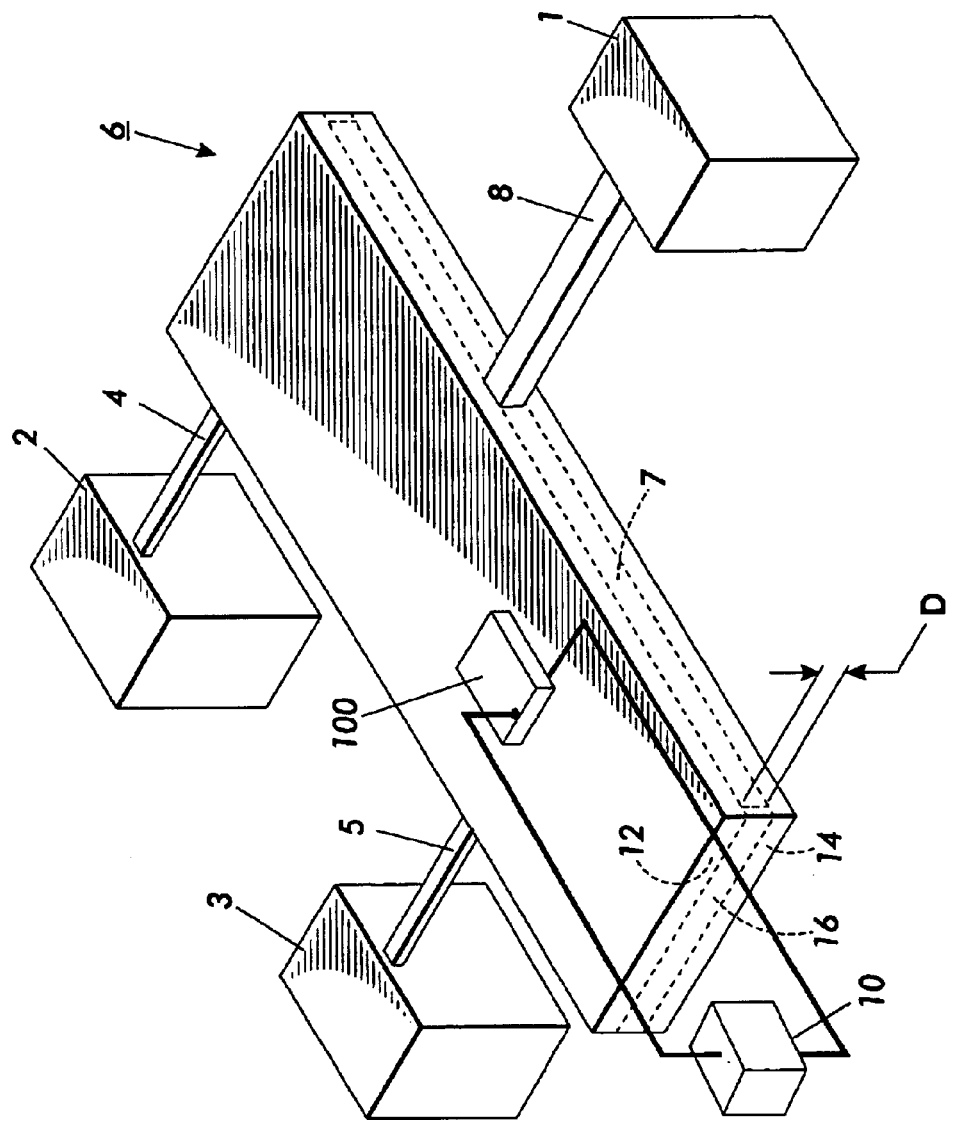
FIG. 1 is a schematic of a system wherein liquid electrostatic developer is replenished by means of supplied dispersed toner in accordance with the invention.

The replenishment system of this invention can be understood by referring to the drawing, wherein all illustrated components are present in a piece of equipment, such as a printer, not shown.

FIG. 1 illustrates an embodiment of the invention wherein supply vessel 1 contains a liquid developer consisting essentially of (A) a nonpolar carrier liquid having a Kauri-butanol value of less than 30, (B) thermoplastic resin particles (toner particles) having a median particle size (volume weighted) less than 15 .mu.m, and with 90% of the particles (volume weighted) less than 30 .mu.m which optionally may contain a dispersed colorant, and (C) a charge director compound, the percent of solids in the developer being abut 0.5 to 6% by weight based on the total weight of liquid developer. "Consisting essentially of" means that the liquid electrostatic developer may contain unspecified components that do not prevent the advantage of the liquid developer from being realized. The replenishment system enables the concentration of solids in the liquid developer to be maintained in the range of about 0.5 to 6% by weight, based on the total weight of liquid developer, using a liquid developer contained in supply vessel 1.

The developer solids concentration is monitored by means known to those skilled in the art such as a calibrated light attenuation sensor. The ingredients for the liquid developer are obtained from at least one liquid toner concentrate vessel 2 that contains aggregates of thermoplastic resin particles having a median particle size (volume weighted) greater than 15 .mu.m, with 90% of the particles (volume weighted) not less than 30 .mu.m. The concentrate is composed of 30 to 100% by weight of such particles and to 70% by weight nonpolar liquid (A). Vessel 3 contains liquid component (A). Means 4 and 5 respectively communicate with concentrate vessel 2 and liquid vessel 3 connecting said vessels with dispersing vessel 6 in order to supply vessel 6 with liquid toner concentrate from vessel 2 and nonpolar liquid from vessel 3. Communicating means 4 and 5 can be pipes, tubes, conduits, or the like, through which the toner concentrate and nonpolar liquid are supplied and metered (by means not shown) into vessel 6. Metering devices can be solenoid metering pumps, piston pumps, metered feed screws, peristaltic pumps, diaphragm pumps, or other metering devices selected on the basis of the physical characteristics of the material being transported. Dispersing vessel 6 contains means for providing an electric field as shown in FIG. 1. Vessel 6 comprises two plates 12 and 14 separated at the perimeter by a resilient member 16. An ultrasonic transducer 100 is connected to voltage supply 10. An ultrasonic transducer 100 can be disposed within plates 12 and 14 or in contact with the outside surface thereof. When a voltage is supplied to ultra sonic transducer 100 vibrational energy is transmitted through dispersing vessel 6, which enable agglomerates of the ink or developer to break apart or fracture thereby providing for the efficient desirable dispersion of the ink solids in the ink carrier fluids.

It has been found by applicants that the agglomerates of toner particles disassociate in an almost explosive manner when subjected to vibrational energy which is near the acoustic slow wave frequency of the aggregates to be dispersed.

Means 8, communicating with dispersing vessel 6, connects the vessel with supply vessel 1 containing the liquid developer to be replenished.

Communicating means 8 can be pipes, tubes, conduits, or the like, through which the dispersed toner particles are supplied and metered (by means not shown) into said vessel as required to maintain the developer solids concentration in vessel 1 as measured by the solids concentration sensor (not shown). The metering device can be solenoid metering pumps, metered feed screws, peristaltic pumps, piston pumps, diaphragm pumps, or other metering characteristics of the material being transported. At least one of supply vessel 1, liquid toner concentrate vessel 2 or liquid vessel 3.

The specific ingredients used to make up the composition of the liquid electrostatic developer are described in U.S. Pat. No. 5,492,788 which is incorporated by reference. The liquid developers suitable for the present invention generally comprise a liquid vehicle, toner particles, and a charge control additive. The liquid medium may be any of several hydrocarbon liquids conventionally employed for liquid development processes, including hydrocarbons, such as high purity alkanes having from about 6 to about 14 carbon atoms, carrier fluids such as NORPAR 15® and ISOPAR L® or SUPERLA® and ISOPAR L® or a mixture of two or more of the above fluids. The amount of the liquid employed in the developer of the present invention is from about 90 to about 99.9 percent, and preferably from about 95 to about 99 percent by weight of the total developer dispersion. The total solids content of the developers is, for example, 0.1 to 10 percent by weight, preferably 0.3 to 3 percent, and more preferably, 0.5 to 2.0 percent by weight. Examples of charge directors include components such as (1) a protonated AB diblock copolymer of poly[2-dimethylammoniumethyl methacrylate bromide co-2-ethylhexyl methacrylate], poly[2-dimethylammoniumethyl methacrylate tosylate co-2-ethylhexyl methacrylate], poly[2-dimethylammoniumethyl methacrylate chloride co-2-ethylhexyl methacrylate], poly[2-dimethylammoniumethyl methacrylate bromide co-2-ethylhexyl acrylate], poly[2-dimethylammoniumethyl acrylate bromide co-2-ethylhexyl methacrylate], poly[2-dimethylammoniumethyl acrylate bromide co-2-ethylhexyl acrylate], poly[2-dimethylammoniumethyl methacrylate tosylate co-2-ethylhexyl acrylate], poly[2-dimethylammoniumethyl acrylate tosylate co-2-ethylhexyl acrylate], poly[2-dimethylammoniumethyl methacrylate chloride co-2-ethylhexyl acrylate], poly[2-dimethylammoniumethyl acrylate chloride co-2-ethylhexyl acrylate], poly[2-dimethylammoniumethyl methacrylate bromide co-N,N-dibutyl methacrylamide], poly[2-dimethylammoniumethyl methacrylate tosylate co-N,N-dibutyl methacrylamide], poly[2-dimethylammoniumethyl methacrylate bromide co-N,N-dibutylacrylamide], or poly[2-dimethylammoniumethyl methacrylate tosylate co-N,N-dibutylacrylamide]; (2) a mixture, for example 50:50, of at least two protonated AB diblock copolymers; (3) a mixture, for example 50:50, of at least one protonated AB diblock copolymer and one quarternized AB diblock copolymer, and the like. The charge directors as illustrated in the patents and copending applications mentioned herein can be selected for the developers of the present invention. The charge director can be selected for the liquid developers in various effective amounts, such as, for example, in embodiments from about 0.5 percent to 80 percent by weight relative to developer solids and preferably 2 percent to 20 percent by weight relative to developer solids. Developer solids include toner resin, pigment, and charge adjuvant. Without pigment the developer may be selected for the generation of a resist, a printing plate, and the like. Examples of other effective charge director for liquid toner particles include anionic glyceride, such as EMPHOS® D70-30C and EMPHOS® F27-85, two products sold by Witco Corporation, New York, N.Y., which are sodium salts of phosphated mono- and diglycerides with saturated and unsaturated substituents respectively, lecithin, Basic Barium Petronate, Neutral Barium Petronate, Basic Calcium Petronate, Neutral Calcium Petronate, oil soluble petroleum sulfonates, Witco Corporation, New York, N.Y., and metallic soap charge directors such as aluminum tristearate, aluminum distearate, barium, calcium, lead, and zinc stearates; cobalt, manganese, lead, and zinc lineolates, aluminum, calcium, and cobalt octoates; calcium and cobalt oleates; zinc palmitate; calcium, cobalt, manganese, lead, zinc resinates, and the like. Other effective charge directors include AB diblock copolymers of 2-ethylhexylmethacrylate-co-methacrylic acid calcium and ammonium salts. Any suitable thermoplastic toner resin can be selected for the liquid developers of the present invention in effective amounts of, for example, in the range of about 99 percent to 40 percent of developer solids, and preferably 95 percent to 70 percent of developer solids, which developer solids includes the thermoplastic resin, optional pigment and charge control agent, and any other component that comprises the particles. Examples of such resins include ethylene vinyl acetate (EVA) copolymers (ELVAX® resins, E. I. DuPont de Nemours and Company, Wilmington, Del.); copolymers of ethylene and an alpha.-.beta.-ethylenically unsaturated acid selected from the group consisting of acrylic acid and methacrylic acid; copolymers of ethylene (80 to 99.9 percent), acrylic or methacrylic acid (20 to 0.1 percent)/alkyl (C.sub.1 to C.sub.5) ester of methacrylic or acrylic acid (0.1 to 20 percent); polyethylene; polystyrene; isotactic polypropylene (crystalline); ethylene ethyl acrylate series sold under the trademark BAKELITE® DPD 6169, DPDA 6182 Natural (Union Carbide Corporation); ethylene vinyl acetate resins, for example DQDA 6832 Natural 7 (Union Carbide Corporation); SURLYN® ionomer resin (E. I. DuPont de Nemours and Company); or blends thereof; polyesters; polyvinyl toluene; polyamides; styrene/butadiene copolymers; epoxy resins; acrylic resins, such as a copolymer of acrylic or methacrylic acid and at least one alkyl ester of acrylic or methacrylic acid wherein alkyl is from 1 to about 20 carbon atoms like methyl methacrylate (50 to 90 percent)/methacrylic acid (0 to 20 percent/ethylhexyl acrylate (10 to 50 percent); and other acrylic resins including ELVACITE® acrylic resins (E. I. DuPont de Nemours and Company); or blends thereof. Preferred copolymers are the copolymer of ethylene and an .alpha.-.beta.-ethylenically unsaturated acid of either acrylic acid or methacrylic acid. In a preferred embodiment, NUCREL®, like NUCREL 599®, NUCREL 699®, or NUCREL 960® are selected as the thermoplastic resin. The liquid developer of the present invention may optionally contain a colorant dispersed in the resin particles. Colorants, such as pigments or dyes and mixtures thereof, are preferably present to render the latent image visible. The colorant may be present in the resin particles in an effective amount of, for example, from about 0.1 to about 60 percent, and preferably from about 1 to about 30 percent by weight based on the total weight of solids contained in the developer. The amount of colorant selected may vary depending on the use of the developer. Examples of colorants include pigments like carbon blacks like REGAL 330®, cyan, magenta, yellow, blue, green, brown and mixtures thereof; pigments as illustrated in U.S. Pat. No. 5,223,368, the disclosure of which is totally incorporated herein by reference.

The present invention improves the efficiency of ultrasonic aggregate dispersion techniques by tailoring the ultrasonic frequency specifically to the nature of the aggregates that are to be dispersed. As discussed in more detail below, aggregate breakup is possible by utilizing ultrasonic waves at or near a specific frequency called the acoustic slow wave frequency. At this point fluid is forced to move through the pore spaces and necks within each individual particle aggregate. This fluid motion exerts viscous drag forces on the particles, especially in the region of particle-particle contact points, and acts to break the adhesive particle-particle bonds within the solid frame of the aggregate. Thus, these forces act over an entirely different distance range, and via a different mechanism, than the forces acting between pressure maxima and minima in an ultrasonic wave. The acoustic slow wave method of the present invention makes use of the realization that the propagation of sound through porous media containing a viscous fluid has different modes of motion which may be excited at different frequencies.

Typical aggregate sizes may vary from 10 to several hundred primary particles, or from 1 micron to 200 microns in average volume diameter prior to sonification. The sonification comprises applying the ultrasonic signal for a period of time of from about 0.01 seconds (e.g., 100 cycles at a 10 KHz slow wave frequency) to several minutes.

In an embodiment of the invention, the acoustic slow wave mode is used to break up particle aggregates in which the physical properties of the particle aggregates and their pore fluid is known. The frequency of the ultrasound is set by knowing the following information: the particle size, some notion of their packing fraction (or percent solids in the aggregates), and the viscosity and density of the pore fluids. From this information, as discussed below, we can estimate the acoustic slow wave frequency, i.e., the frequency that we want to apply to the suspension of fluid and fluid-saturated aggregates as (White, 1965):

$$f_c = \eta \phi / (2\pi k \rho_f) \tag{1}$$

where $\eta$ is the fluid viscosity, $\phi$ is the aggregate porosity, k is the aggregate permeability, and $\rho_f$ is the fluid density.

By applying this frequency ultrasonic signal, or white ultrasonic energy around the acoustic slow wave frequency we can redisperse a coagulated suspension of particles, or prevent coagulation of an initially dispersed suspension.

Figure 4:
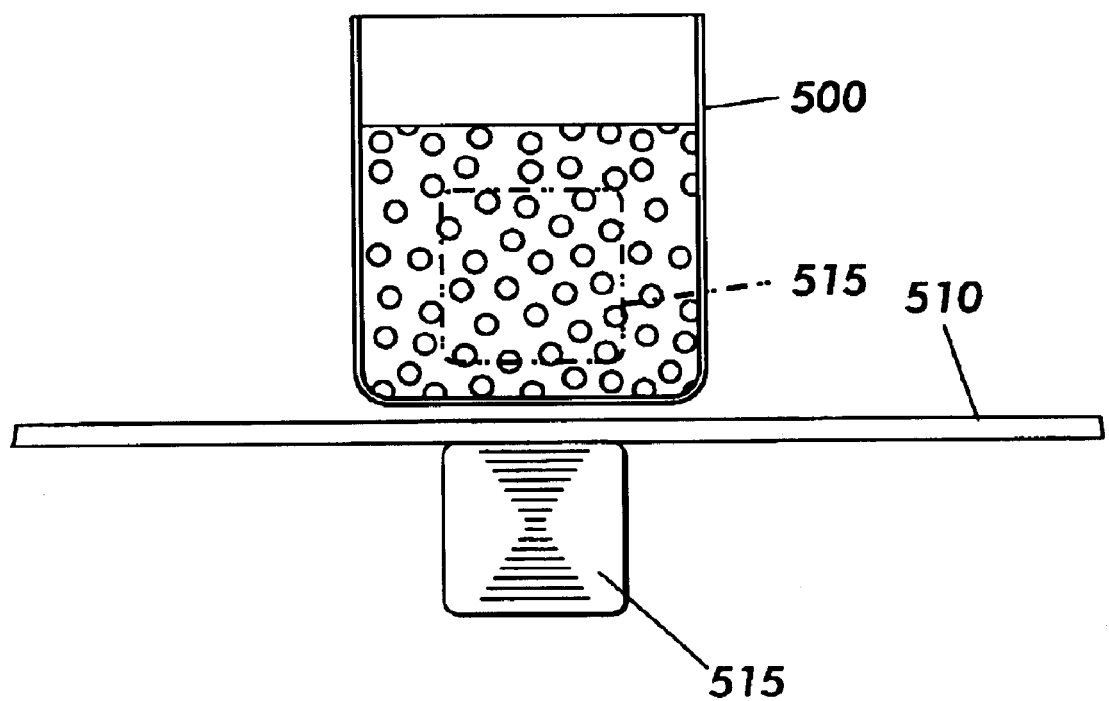
FIG. 4 is an embodiment of the present invention.

The ultrasonic applying means for applying an acoustic slow wave in the present invention can be, for example, Ultrasonic probes vibrating at or around (see the discussion below of "white" sources") can be inserted into containers containing aggregates to be dispersed; Fluid can be pumped through a pipe which has an internal or external ultrasonic piezoelectric probe vibrating at or around the acoustic slow wave frequency. Alternatively, container 500 can be placed on an ultrasonic stage 510 using a piezoelectric vibrator 515, as shown in FIG. 4, that allows vibrations to pass through the container into the fluid/aggregate system at or around the acoustic slow wave frequency.

Figure 5:
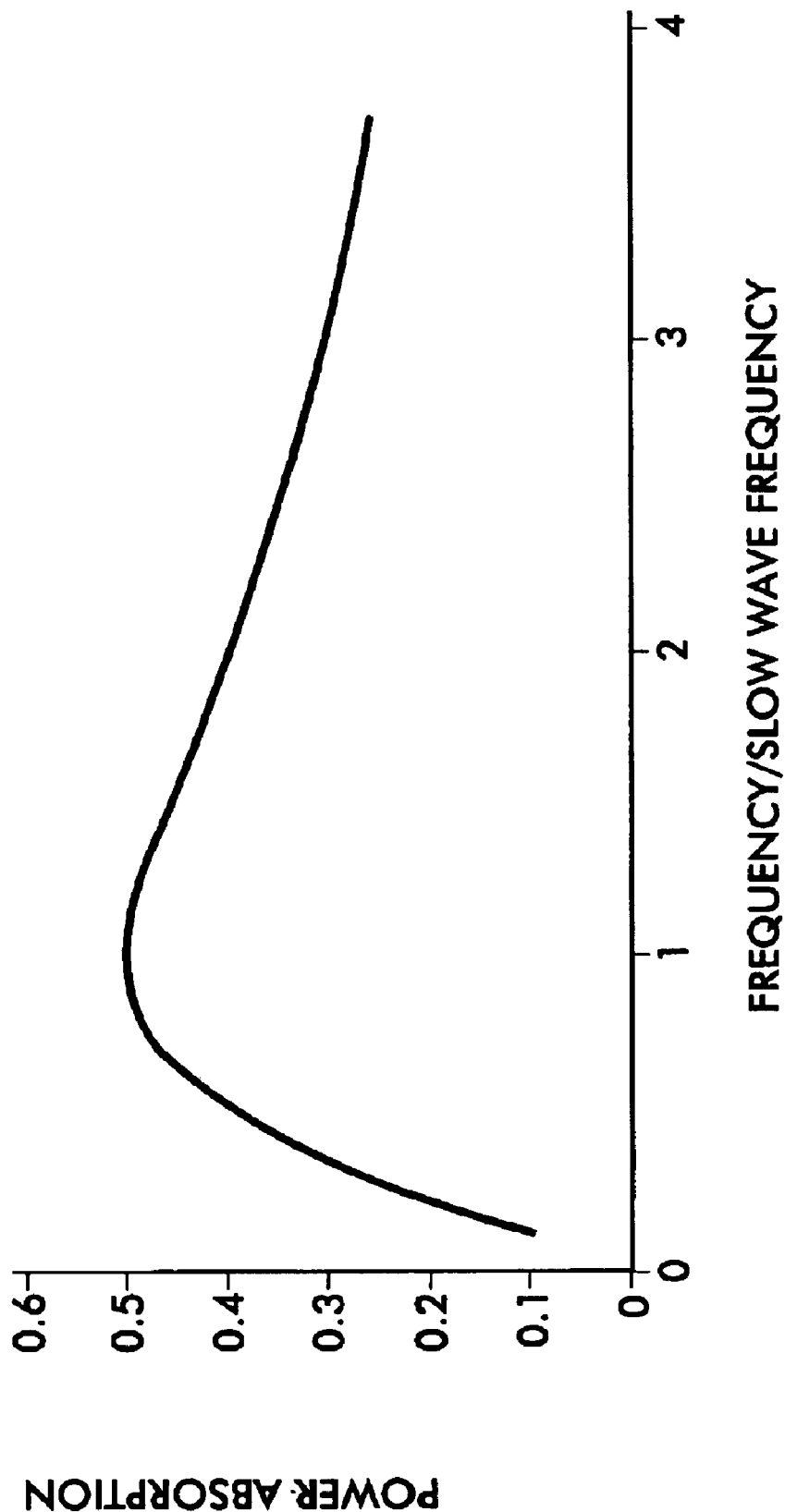
Figure 7:
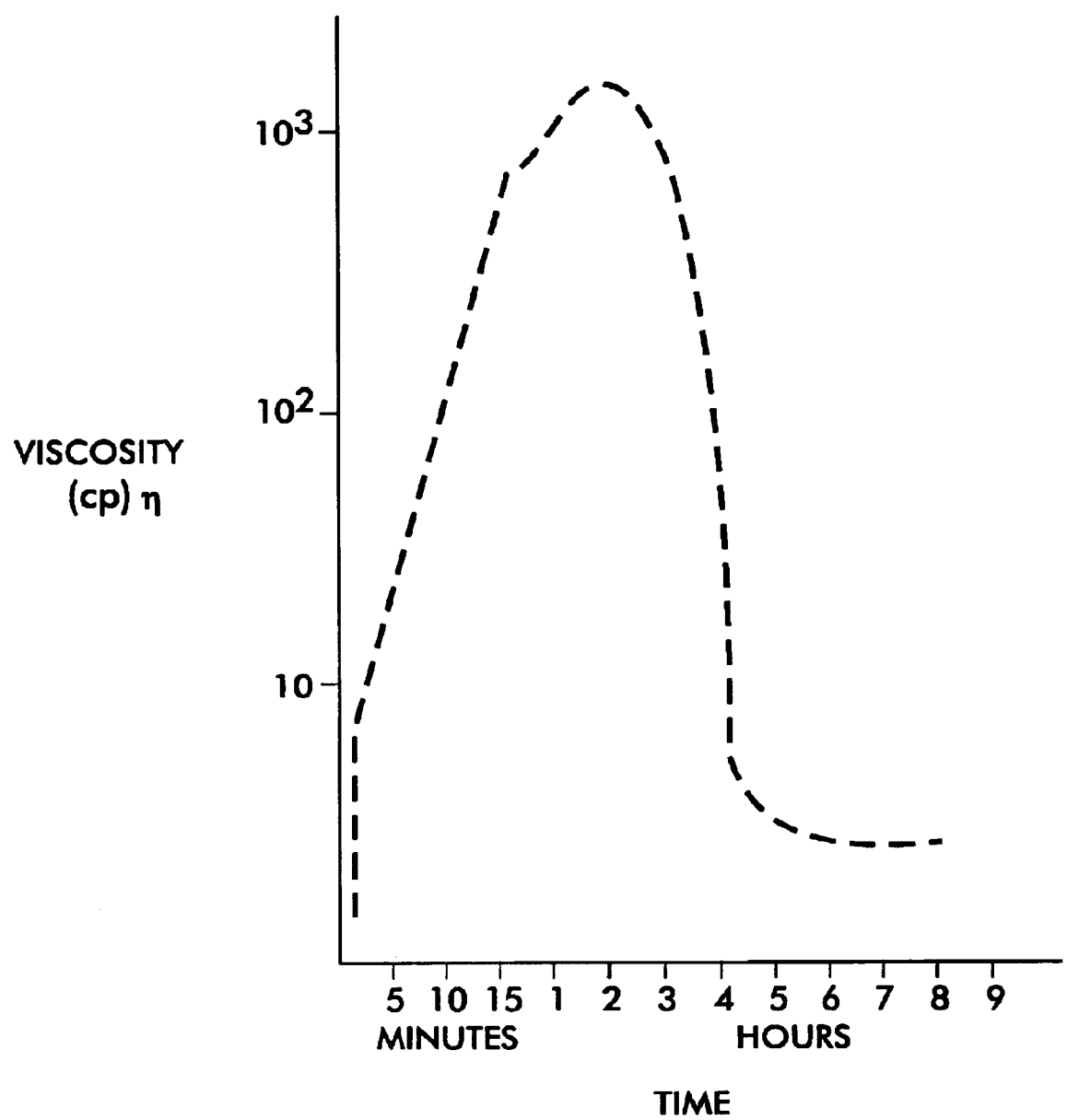
FIG. 7 is a graph showing viscosity as a function of time in Emulsion Aggregation (EA) toner fabrication process.

In addition to setting the frequency of oscillation to the acoustic slow wave frequency, or making a frequency spectrum containing the acoustic slow wave frequency, it is also possible to use feedback control techniques to experimentally determine the acoustic slow wave frequency, and to track changes in the frequency as it changes due to aggregate breakup. If a range of ultrasound frequencies are pumped into a specimen, and the power absorption is analyzed as a function of frequency, at the acoustic slow wave frequency the power absorbed by the system will be the maximum, as shown in FIG. 5. It has been found that compressional attenuation is 90–99% due to excitation of the compressional slow wave over frequency ranges where it can occur. Normal sound wave attenuation provides only a low background power absorption over a broad frequency range compared to the high frequency-specific attenuation due to excitation of the slow wave.

The peak in the power absorption profile can be tracked by power spectrum analysis techniques, and the excitation spectrum changed to follow the time-varying demands of the system (eg., as new aggregates are added, as flow rates vary, etc.).

The present invention can also be utilized as a measurement tool. For example, the power absorbed by an aggregate slurry will give a measurement of the concentration of aggregates. If the amplitude of vibration is kept low enough so that adhesive forces are not overcome and the aggregates broken, this can be used as a measurement tool to determine the concentration of aggregates in a suspension.

Figure 6:
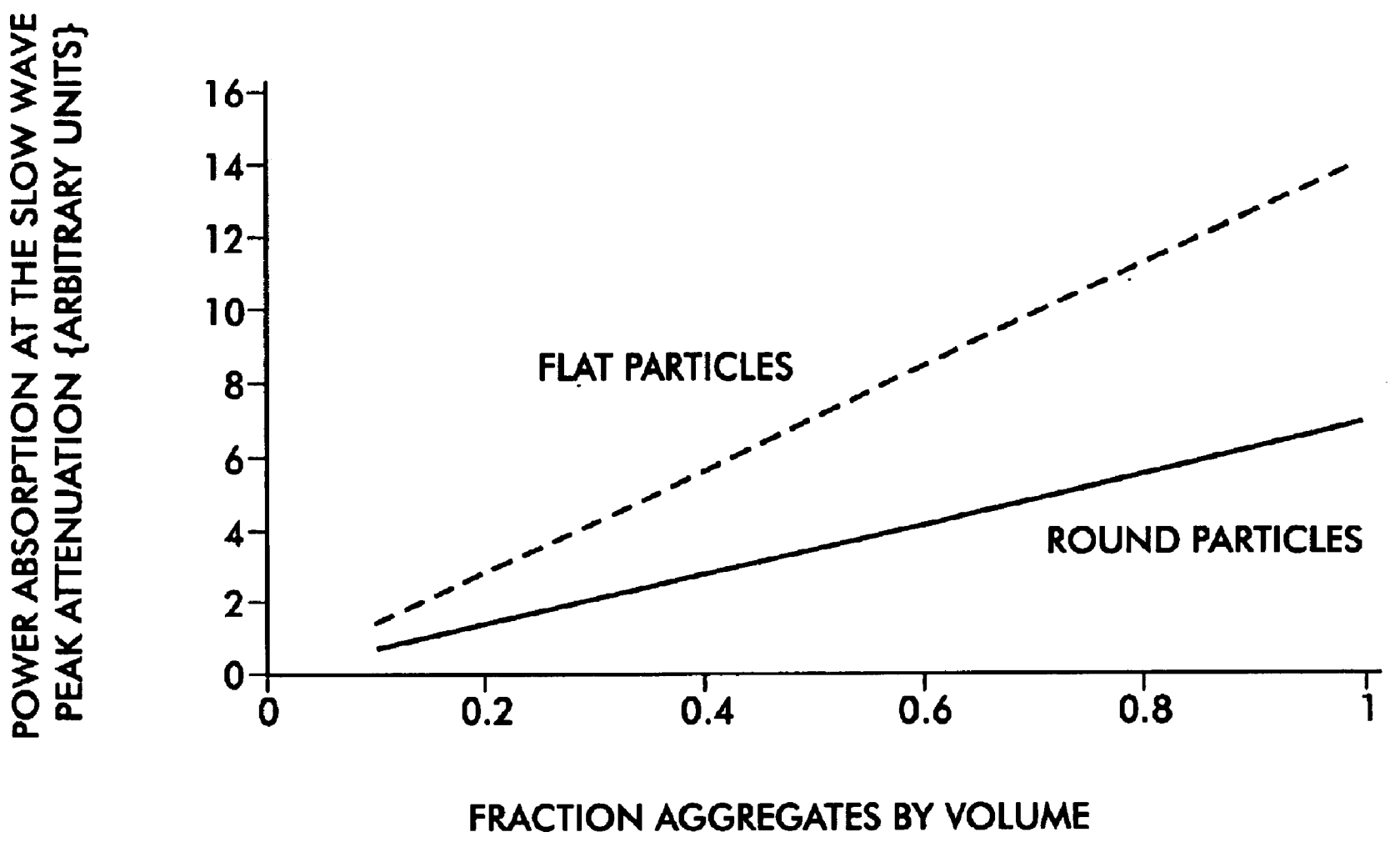

As shown in FIG. 6, the power absorption at the peak of the power absorption frequency spectrum (i.e., the slow wave frequency) is proportional to the concentration of aggregates in the sample. As discussed above, this power absorption is almost entirely due to slow wave excitation in aggregates. Power absorption by normal ultrasound excitation is smaller by 1–2 orders of magnitude. Also noted in FIG. 6 is the dependence of the power absorption-concentration curve on the shape of the pores in the aggregate. For pores between spherical particles the slope of the curve is lower than for pores between long flat particles. Thus, there is some degree of experimental calibration through the use of microscopically characterized samples that must be done if there is a distribution of particle shapes and sizes. Such calibration techniques are well known to those skilled in the art.

Figure 2:
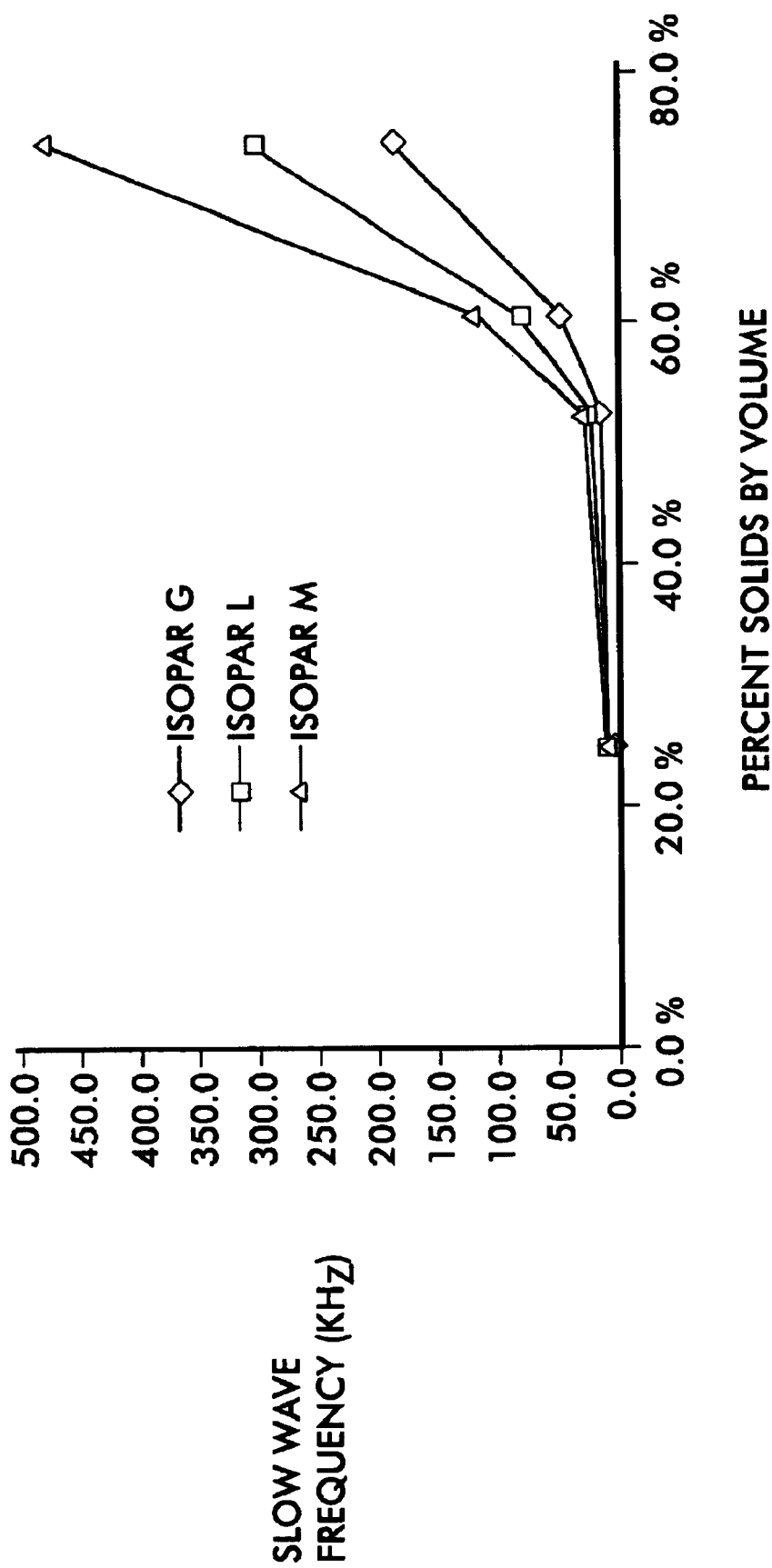
FIG. 2 is a graph of acoustic slow wave frequencies for various liquid developers used in present invention.

Typical acoustic slow wave frequencies are shown in FIG. 2 for aggregates composed of 2-micron particles in ISOPAR® G, L, and M. As indicated in FIG. 2, as the percent solids in an aggregate decreases with breakup, the acoustic slow wave frequency that will have the maximum disruptive effect on the aggregate decreases.

In order to maintain the effectiveness of the ultrasonic vibration throughout its excitation of an aggregate, the frequency of the driving source must either (1) change with time, or preferably, (2) contain all of the appropriate frequencies at all times. Both frequency signatures are possible and potentially useful, and hence offer different embodiments of the invention. Thus, as indicated by FIG. 2, to track the complete breakup of an aggregate that starts at about 60% solids concentration, the source should be "white" over a frequency range of approximately 10–60 kHz (for ISO-PAR® L pore fluid and 2 micron toner particles).

Figure 3:
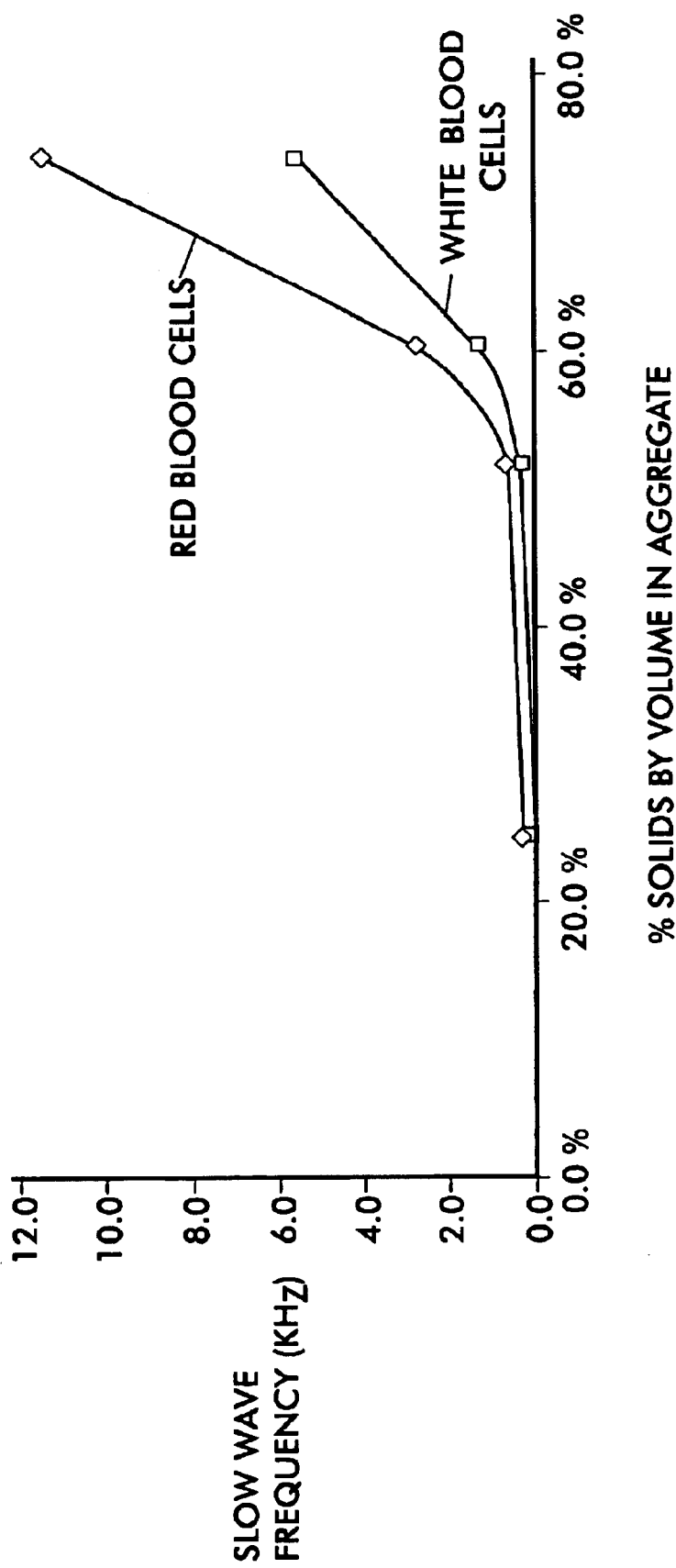
FIG. 3 is a graph of acoustic slow wave frequencies for red blood cells and for white blood cells. Blood cell agglomerates can be redispersed by the present invention.

It is evident that the present invention may be used in other fields. For example, an application is in the prevention of aggregation of blood cells in blood bank supplies to extend shelf life. FIG. 3 illustrates the acoustic slow wave frequencies required to disperse red blood cells and white blood cells that have settled under the influence of gravity in stored whole blood supplies. Bags of whole blood can be put on a sonic stage as in FIG. 4 and an acoustic slow wave frequencies can be applied, thereby keeping blood cells dispersed. While ultrasonic signals may damage blood cells via cavitation, from bubbles forming under the pressure variations of the ultrasound, the sonic frequency range of the appropriate compressional slow wave is unlikely to cause such damage. Cavitation is reduced at these low frequencies.

Another application of the present invention is xerographic toners used in printing machines to break up color pigment aggregates in the EA toner formation process, in order to obtain better color saturation. It is known that the color saturation, or chroma level, that can be achieved by color toners consisting of color pigments dispersed in a transparent binder is influenced to a large degree by the completeness of the dispersion of the pigments. Aggregated pigments tend to produce toners with washed-out or less bright colors than those achieved with well-dispersed pigments. On the other hand, it is difficult to achieve good dispersion with color pigments. This is due to the strong van der Waals forces that exist between these pigments, leading to strong, hard to disperse, aggregates.

The acoustic slow wave may not be general applicable to breaking up pigment aggregates in xerographic toners because the pigments are ground into the toner binders in the dry state. There is no pore fluid motion to break up the pigment aggregates.

However, in the EA toner formation process, the pigments are added to the fluid suspension of latex spheres in liquid. Thus there is fluid that can be excited into the acoustic slow wave mode of relative fluid-solid motion via ultrasonic waves. In liquids, ultrasonic waves up to about 4 MHz can be generated. EA toner formation process is known, for example, U.S. Pat. No. 5,482,812 to Hopper et al and U.S. Pat. No. 6,210,853 are hereby incorporated by reference. Additionally, there is illustrated in U.S. Pat. No. 5,278,020, the disclosure of which is totally incorporated herein by reference, for example, discloses a process for the preparation of a toner composition comprising the steps of (i) preparing a latex emulsion by agitating in water a mixture of a nonionic surfactant, an anionic surfactant, a first nonpolar olefinic monomer, a second nonpolar diolefinic monomer, a free radical initiator and a chain transfer agent; (ii) polymerizing the latex emulsion mixture by heating to form nonpolar olefinic emulsion resin particles, (iii) diluting the nonpolar olefinic emulsion resin particle mixture with water; (iv) adding to the diluted resin particle mixture a colorant or pigment particles and optionally dispersing the resulting mixture with a homogenizer; (v) adding a cationic surfactant to flocculate the colorant or pigment particles to the surface of the emulsion resin particles; (vi) homogenizing the flocculated mixture at high shear to form statically bound aggregated composite particles with a volume average diameter of less than or equal to about 5 microns; (vii) heating the statically bound aggregate composite particles to form nonpolar toner sized particles; (viii) halogenating the nonpolar toner sized particles to form nonpolar toner sized particles having a halopolymer resin outer surface or encapsulating shell; and (ix) isolating the nonpolar toner sized composite particles.

Figure 10:
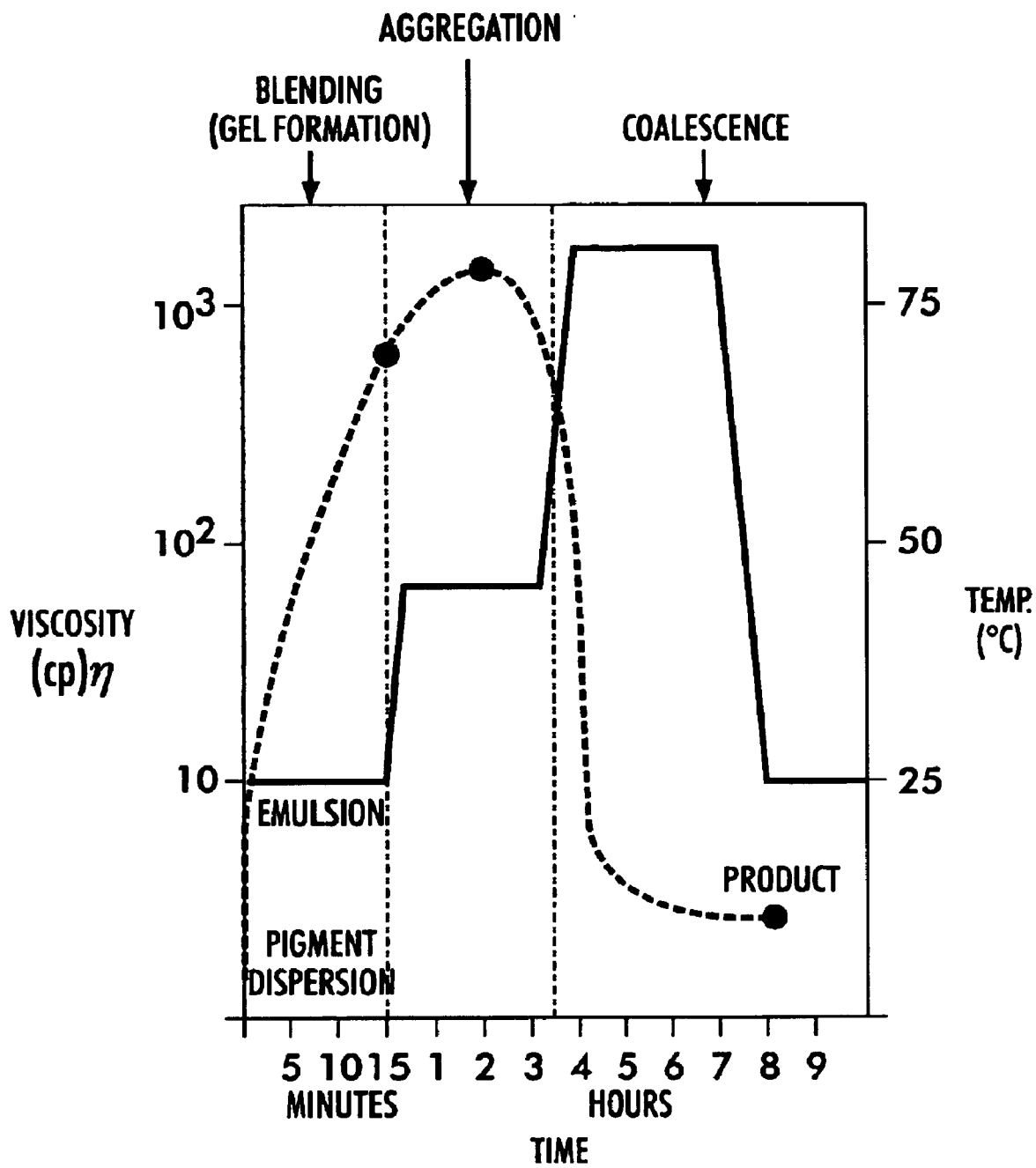
FIG. 10 is a schematic indicating variation in emulsion viscosity (indicated by curve 400) with time and temperature in the EA toner formulation process.

The slow wave frequency can be applied in the EA toner formation process steps to generate high shear to the mixture. It is preferred to varying the slow wave frequency base as the viscosity of the mixture changes as shown in FIG. 10.

An application of the acoustic slow wave to the dispersion of Blue 27 pigment in the manufacture of EA toner proceeds along the following lines. As shown in FIG. 10, the pigment dispersion step occurs first in the EA manufacturing process. The pigment is added to the latex blend immediately, when the suspension viscosity is low. The viscosity of the system immediately starts to rise. High cohesion pigments such as Blue 27 are not dispersable via conventional sonification methods, as discussed above. However, due to the much higher efficiency of power absorption at the acoustic slow wave provided by the present invention, shear stresses acting on particle-particle contacts due to the relative fluid-solid out-of-phase-motion acts to break particle-particle van der Waals bonds and disperse pigment aggregates. The energy devoted to breaking up aggregates by this out of phase motion can be as much as 20 times that exerted by conventional sonification methods (see FIG. 5). The van der Waals cohesive bonds are approximately 3× higher for Blue 27 than for Blue 15:3, for which sonification works (barely). Thus slow wave absorption is strong enough to disperse Blue 27 pigments, when the slow wave frequencies is generated.

Figure 8:
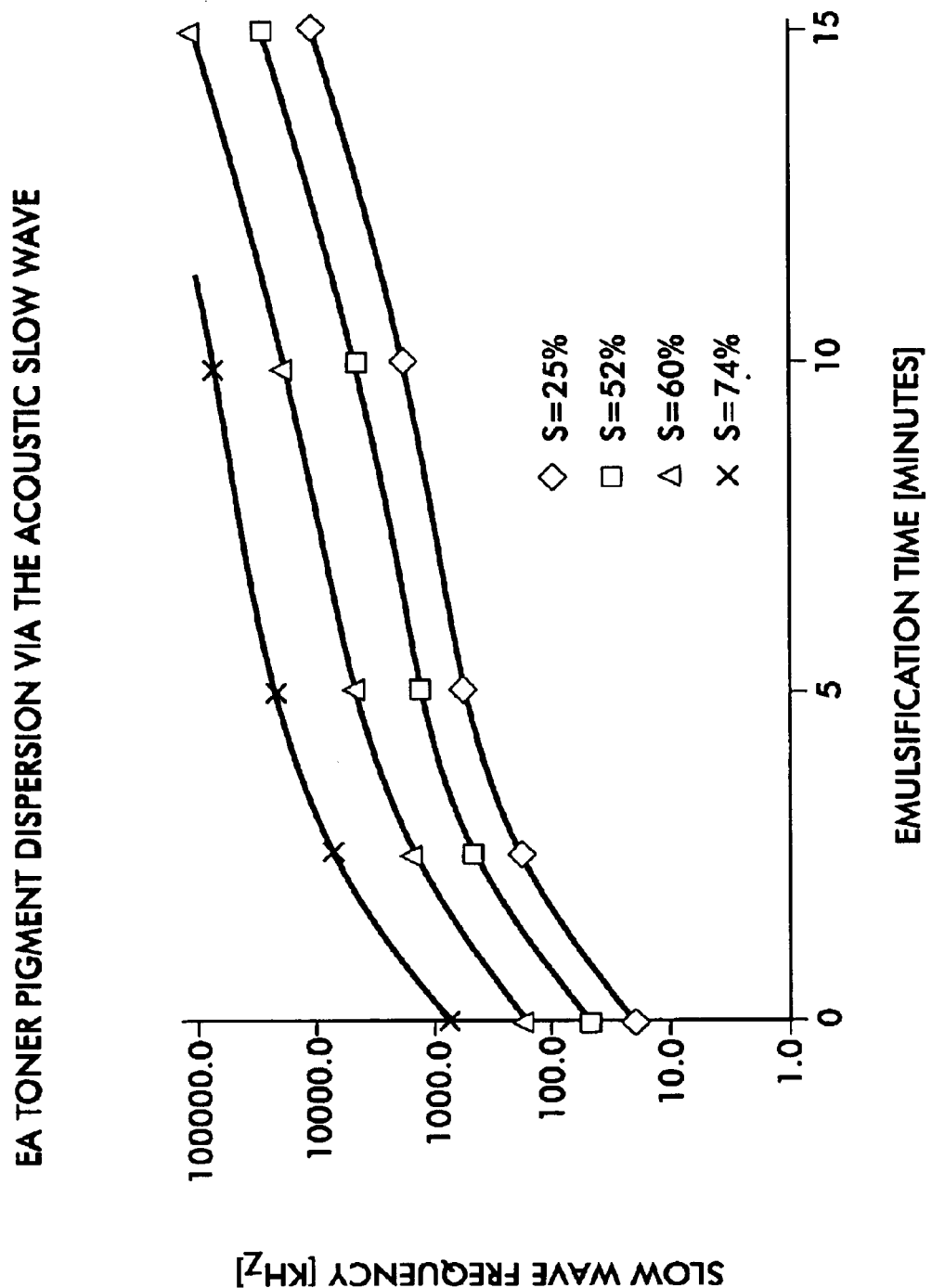
FIG. 8 is a graph showing slow wave frequency as a function of time in EA toner fabrication process.

Slow wave frequencies as a function of EA toner emulsification time is shown in FIG. 8. FIG. 8 illustrates a calculated acoustic slow wave frequency as a function of time for 4 different aggregate packings. Ultrasonic frequencies below 4 MHz (4000 on the above KHz scale) are physically practical in liquid systems. Ultrasonic transducers typically operate in the frequency range below 100 KHz. However, the ultrasonic transducers used for medical ultrasound equipment operate at frequencies of 2 MHz and 4 MHz a type suitable for the present invention. As seen from FIGS. 8 and 9, transducers in this frequency range would be effective in breaking up pigment aggregates in the time range 2–10 minutes into the emulsion and blending steps in the EA manufacturing process.

There are several specific ways in which ultrasonic energy at the slow wave frequency can be applied:

The peak in the power absorption spectrum (i.e., FIG. 5) can be determined by the sonification of the blending container over a broad (i.e., "white" frequency distribution. Well known signal processing techniques can then be used to extract the peak frequency in the absorption spectrum. There are several ways in which this analysis can be done. One involves generating a "white" sound pulse, or a transient ultrasound pulse of known frequency distribution, on one side of a sample of solid-liquid dispersion, and measuring the time-dependent signal propagated through the dispersion. Frequency analysis of the incident and transmitted pulses yields information on the absorption of sound in the dispersion as a function of frequency. From this analysis it is possible to determine the peak frequency for ultrasound absorption. This peak frequency (assumed to be unchanging in time) can then be applied at high power to break up aggregates.

Adaptive frequency determination techniques can also be employed and are known to those skilled in the art, are advantageous. In this technique, the peak in the ultrasound power absorption spectrum is determined, just as in the paragraph above. Now, however, this optimum frequency increases with time as the viscosity of the suspension increases with the progression of the polymerization reactions (see FIG. 10). Counteracting this slow wave frequency increase due to increasing viscosity, the slow wave frequency will decrease with time as the percent solid aggregates in the suspension decreases with breakup of aggregates. The playoff between these two effects can be difficult to model, but comparatively easy to track experimentally. This tracking and continuous change in the applied ultrasound frequency ensured that the conversion of ultrasound excitation energy into relative motion of solid and liquid in aggregates is continually kept near 100% efficiency, giving the maximum possible aggregate breakup per kilowatt of energy supplied to the ultrasonic transducer. This is perhaps the preferred embodiment since it results in a well dispersed pigment condition throughout the first 10–15 minutes of the EA manufacture process.

The simplest embodiment of the invention would consist of an application of a fixed ultrasonification frequency, e.g., either 2 or 4 MHz, to the suspension sample. As the viscosity of the suspension increases with time (see FIG. 10) the acoustic slow wave frequency increases from the tens of kiloHertz range up into the kiloHertz range. Thus, the resonant frequency for solid-liquid out-of-phase motion approaches the fixed ultrasound frequency from below. This resonant frequency is never permitted to exceed the fixed ultrasound application frequency because of floc breakup. As the viscosity continues to increase, the percent solids, %S, in the aggregate will decrease to prevent the acoustic slow wave frequency from increasing, assuming there is enough ultrasound energy available to ensure breakup. Dispersed aggregates are unlikely to reform due to Brownian motion because the rapidly increasing suspension viscosity makes further flocculation increasingly difficult.

There are several manners in which ultrasound can be applied: Circulation pumps can recirculate the suspension fluid, and transducers can be applied to the outside of the pipes as in FIG. 1. One or more transducers can be applied to the outside of the process container in which the reaction is proceeding as in FIG. 4. Further, the ultrasonic transducers can be immersed in the process container, especially near the bottom where larger aggregates will sediment out of solution.

Note that the acoustic slow wave energy applied to break up pigment particle aggregates will not effect the formation of latex particle spheres in the process suspension. These particles form in the size range 10–100 nm, and have a much higher acoustic slow wave frequency. What is going on with the ultrasonic excitation of fluid/pigment system is decoupled from what is going on with the latex. The time period in which the latex particles aggregate into toner occurs in the time range 15 minutes–4 hours into the process. The ultrasound for excitation of acoustic slow waves is turned off by the time this process starts, but would not interfere with the latex aggregation process even if it were not turned off.

The acoustic slow wave technique for obtaining good pigment particle dispersion: enables the development of toners which have as high chroma as possible at any particular pigment loading, consistent with the optical properties of the pigment; allow higher pigment concentrations (into a pigment loading regime that would normally be inaccessible due to pigment aggregation problems); and allows the use of pigments which would not previously be usable due to their high stickiness. Examples of commonly available color pigments are listed in Table I below, together with their predicted cohesive forces. The pigments are listed in order of increasing cohesive force. There are 105 pigments represented in the table. The median pigment cohesive force is approximately 1479 nN. This is quite close to the cohesive force for Blue 15:3, 1691.8 nN. Blue 15:3 is a pigment typically used in cyan xerographic toners. It is chosen not only because of it's good color properties, but also because is can be dispersed using commonly available sonification dispersion technology.

Another blue pigment, Blue 27, actually has better spectral characteristics, but is almost impossible to disperse using conventional techniques. As shown in the table below, Blue 27 is one of the most difficult pigments to disperse, having the sixth highest cohesion force listed in the table, 6093.4 nN. This cohesion force is 3.6 times as high as that for Blue 15:3. Other color pigments have much higher cohesive forces, on the order of $10^5$ nN, over 60 times the cohesive force of Blue 15:3. Blue 15:3 has the highest cohesive force of any conventionally dispersed pigment. Clearly a different approach is required to disperse highly cohesive pigments.

Predicted pigment cohesiveness

| Pigment | Cohesion Force [nN] |
|---|---|
| Yellow 65 | 786.97 |
| Yellow 12 | 876.21 |
| Yellow 3 | 918.87 |
| Yellow 14 | 919.08 |
| Red 168 | 942.98 |
| Yellow 83 | 971.94 |
| Yellow 13 | 1029.93 |
| Red 41 | 1040.22 |
| Yellow 97 | 1061.39 |
| Yellow 74 | 1065.59 |
| Yellow 73 | 1127.19 |
| Yellow 17 | 1136.14 |
| Yellow 1 | 1137.03 |
| Yellow 152 | 1151.07 |
| Yellow 16 | 1176.68 |
| Red 88 | 1182.08 |
| Red 170 | 1184.85 |
| Blue 61 | 1236.31 |
| Red 112 | 1240.73 |
| Red 38 | 1245.04 |
| Yellow 95 | 1260.75 |
| Red 22 | 1264.84 |
| Red 146 | 1271.12 |
| Red 171 | 1277.99 |
| Red 2 | 1295.59 |
| Red 185 | 1297.96 |
| Yellow 81 | 1301.93 |
| Red 5 | 1307.95 |
| Yellow 113 | 1325.09 |
| Blue 56 | 1328.31 |
| Red 3 | 1331.31 |
| Red x | 1342.10 |
| Red 144 | 1353.97 |
| Red 188 | 1355.37 |
| Red 208 | 1357.07 |
| Red 119 | 1360.39 |
| Red 14 | 1362.66 |
| Red 10 | 1365.81 |
| Yellow 60 | 1369.12 |
| Red 9 | 1373.09 |
| Red 176 | 1378.48 |
| Yellow 55 | 1386.11 |
| Red 4 | 1390.84 |
| Red 187 | 1400.38 |
| Yellow 120 | 1406.43 |
| Red 23 | 1407.78 |
| Red 17 | 1414.27 |
| Red 224 | 1418.94 |
| Red 175 | 1431.69 |
| Yellow 93 | 1432.77 |
| Red 90 | 1434.89 |
| Yellow 101 | 1460.64 |
| Red 83 | 1478.77 |
| Yellow 116 | 1498.04 |
| Red 7 | 1498.59 |
| Blue 15:2 | 1504.21 |
| Red 179 | 1505.35 |
| Yellow 98 | 1512.14 |
| Red 202 | 1516.31 |
| Red 190 | 1541.36 |
| Red 123 | 1555.47 |
| Red 149 | 1558.23 |

-continued

Predicted pigment cohesiveness

| Pigment | Cohesion Force [nN] |
|---|---|
| Red 6 | 1568.86 |
| Red 1 | 1585.06 |
| Red 122 | 1594.75 |
| Blue 60 | 1611.39 |
| Red 177 | 1611.73 |
| Red 209 | 1618.39 |
| Blue 15:1 | 1639.83 |
| Red 166 | 1649.04 |
| Blue 16 | 1667.68 |
| Yellow 139 | 1684.55 |
| Blue 15:3 | 1691.76 |
| Yellow 108 | 1742.50 |
| Red 49 | 1755.33 |
| Blue 1:2 | 1852.58 |
| Red 226 | 1875.45 |
| Blue 15 | 1942.07 |
| Yellow 24 | 2005.13 |
| Red 216 | 2013.92 |
| Red 172 | 2138.76 |
| Red 49:2 | 2220.67 |
| Red 49:1 | 2318.05 |
| Red 178 | 2508.80 |
| Red 48:1 | 2591.00 |
| Yellow 117 | 2612.47 |
| Red 53:1 | 2660.94 |
| Red 48:3 | 2696.04 |
| Yellow 104 | 2753.71 |
| Blue 24:x | 2759.02 |
| Red 52:1 | 2771.27 |
| Blue 63 | 2820.21 |
| Red 63:1 | 3054.42 |
| Red 57:1 | 3177.44 |
| Red 48:2 | 3181.31 |
| Red 60:1 | 3611.72 |
| Red 200 | 4082.60 |
| Blue 24 | 4645.04 |
| Red 67 | 5890.03 |
| Blue 27 | 6093.39 |
| Red 66 | 6152.33 |
| Yellow 32 | 42789.72 |
| Yellow 119 | 61644.70 |
| Red 102 | 89563.93 |
| Red 101 | 103150.37 |

The present invention is believed to be applicable to not only pigments used in manufacture of color toner (see Table above) but also to those used in the manufacture of photoreceptors (HoGaPc, PCZ, etc.)

Having in mind the main elements of the present invention, and not wanting to be limited to theory, the present invention is believed to operate as follows:

When a solid containing a fluid is subject to a sound wave, the fluid and the liquid will oscillate in the direction of propagation of the sound wave. In general, the fluid and the porous solid respond at slightly different rates.

In the limit of very low frequency the porous solid and the liquid will respond completely in phase, resulting in no net motion of the fluid with respect to the porous solid. In this limit, as discussed in the paragraph above, forces within the fluid-saturated solid occur mainly between the maximum and minimum pressure positions within the solid, located ½ wavelength apart. Since a single particle agglomerate is small compared to the size of the wavelength of the sound wave, the pressure differences within a single agglomerate are small, resulting in small forces acting to break up the particle.

Another dispersion mechanism is cavitation. However, this can result in inclusion of gas bubbles trapped within the sample due to rapidly increasing suspension viscosity.

As the frequency of the driving sound wave increases, the viscous fluid motion lags slightly behind that of the approximately rigid solid. This results in fluid motion through pores in the particulate solid, which in turn induces stresses on the particle-particle contact points.

As the frequency increases, the phase lag in relative motion between the solid and liquid also increases, at least up to a point. At a point called the acoustic slow wave point the motion of the solid and liquid will be 180 degrees out of phase. At this point we have the maximum amount of motion of the fluid with respect to the aggregated solid. This results in the maximum viscous stress on the adhesive bonds. If these viscous shearing forces exceed the shear strength of the adhesive bonds between particles, the aggregate will start to fall apart. Now, however, these forces tending to destroy the aggregate will occur on the interparticle length scale, not on a scale of ½ the wavelength of the sound wave in the composite fluid.

The first analysis of these different modes of fluid motion was carried out by Biot (1956a,b; 1962), and has been a topic of continuing research [see Johnson, Plona, and Kojima (1994) and references cited therein]. The acoustic slow wave mode is also sometimes called the "compressional slow wave" or just the "slow wave". These waves have been observed experimentally in a variety of porous solids, and are well verified (Johnson, et. al., 1994). Indeed, experimental, measurements [Plona, D'Angelo, and Johnson (1991); Johnson, Plona, and Kojima (1994)] show that compressional attenuation is 90–99% due to excitation of the compressional slow wave over frequency ranges where it can occur. Normal sound wave attenuation provides only a low background power absorption over a broad frequency range compared to the high frequency-specific attenuation due to excitation of the slow wave.

The frequency of the acoustic slow wave mode, $f_c$, in an infinite porous solid is given by (White, 1965):

$$f_c = \eta \phi / (2\pi k \rho_f) \tag{2}$$

where $\eta$ is the fluid viscosity, $\phi$ is the aggregate porosity, k is the aggregate permeability, and $\rho_f$ is the fluid density. $\phi$ depends on the volume fraction of solids in the aggregate particle via:

$$\phi = 1 - 100 * \% S \tag{3}$$

where % S is the percent of solids in the aggregate, by volume. This expression can be easily converted to reflect porosity in terms of % S by weight.

It is very difficult to directly measure the permeability of a single particle aggregate. Therefore it is preferable to predict the aggregate permeability. For this analysis we make use of the Carmen-Kozeny equation, which has the advantage of being a physically plausible form suggested by physical arguments, with a phenomenologically determined prefactor:

$$k = B\phi^3 / \{S_v^2 (1-\phi)^2\} \tag{4}$$

where B is a constant, typically on the order of 5, and $S_v$ is the particle surface area per unit volume within the aggregate.

$S_v$ will depend on the particle size and packing of the particles, and is inversely proportional to particle diameter (Williams, 1968). Several specific particle packings have been used to calculate both $S_v$ (for use in Equations (2)–(4)) and % S in FIGS. (2) and (3), using information on the packings provided in Williams (1968). For example, for cubic close packing of particles, the porosity $\phi = 0.476$, and $S_v = \pi/D$, where D is the particle diameter. For body centered cubic packing the porosity $\phi = 0.395$, and $S_v = 2\pi/D$. For face centered cubic packing the porosity $\phi=0.26$, and $S_v=4\pi/D$. For random packing the porosity $\phi=0.63$, and $S_v=\pi/D$. This information on $S_v$, plus Equations (3)–(4) allow the compressional slow wave frequency to be estimated by Eq.(2).

Figure 9:
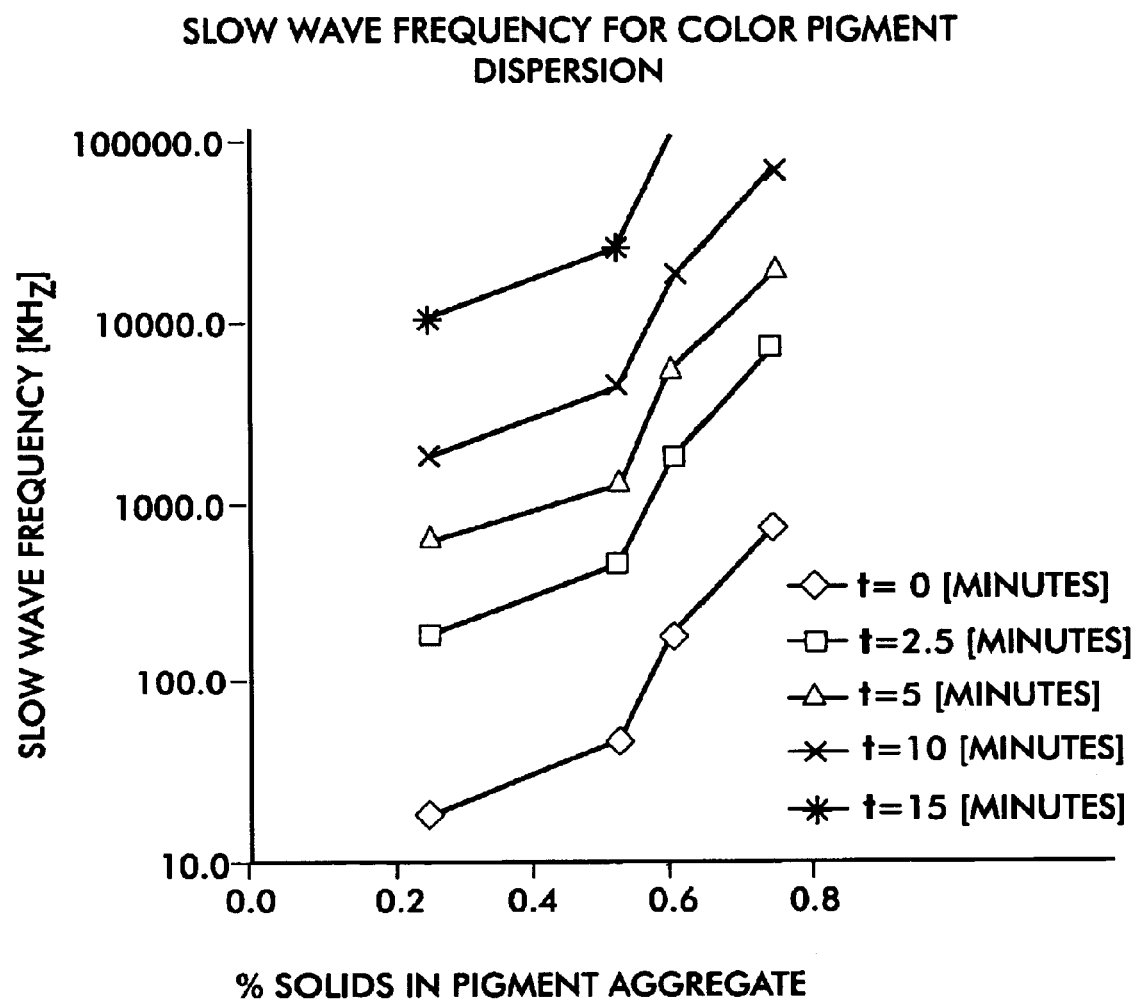
FIG. 9 is a graph showing slow wave frequency as a function of percent solids in EA toner fabrication process.

As indicated in FIG. 9, as the percent solids in an aggregate decreases with breakup, the acoustic slow wave frequency that will have the maximum disruptive effect on the aggregate decreases. In order to maintain the effectiveness of the ultrasonically-driven device throughout it's contact with an aggregate, the frequency of the driving source must either (1) change with time, or (2) contain all of the appropriate frequencies at all times. Both frequency signatures are possible and potentially useful, and hence offer different embodiments of the invention. In the case of EA pigment dispersion, the ultrasound frequency can sit at a fixed value, for example, 300 KHz and the increasing emulsion viscosity will increase the slow wave frequency of the range of condensed aggregates through more dispersed aggregates with time. Note that this is different from the usual aggregate breakup case, where it is preferred to decrease the applied frequency with time due to the decrease in slow wave frequency with progressive aggregate breakup. Thus, in principle the EA pigment aggregate breakup is easier to implement than in general aggregates (for example in inks).

In recapitulation, there has been provided a method and apparatus for dispersal of aggregates in a fluid medium. The method and apparatus provides tailoring the ultrasonic signal frequency to the particular system (i.e., pigment particle size, fluid viscosity and density range, aggregate solid fraction range) to be dispersed. Applicants have found that the method and apparatus provides at the specified (acoustic slow wave) frequency the utilization (or efficiency) of ultrasonic energy is increased by a factor a approximately 20×, the conversion of applied ultrasonic energy into particle motion approaches 100% from the usual 5% ultrasonic energy conversion; the frequency can be predicted in terms of measurable system parameters. The method provides feedback techniques that can be utilized to track aggregate breakup as a function of time and the optimum ultrasonic frequency tracked as the system parameters change.

There are provided simple and economical process for making toner including the steps of: dispersing pigment aggregates and wax in a solution of particle latex constituents; emulsifying the solution; blending the solution; aggregating and coalescing the solution to form toner particles; subjecting the solution to an acoustic slow wave frequency to cause pore fluid motion within pigment aggregates thereby breaking up pigment aggregates in the solution, said subjecting step is applied during one or more of said steps of: said dispersing, emulsifying, blending or aggregating; washing the toner particles; and drying the toner particles; wherein said subjecting step includes the step of: determining the acoustic slow wave frequency; and wherein said determining step includes calculating said acoustic slow wave frequency from the following equation:

$$f_c=\eta\{S_v^2(1-\phi)^2\}/(2\pi B\phi^2\rho_f)$$

Where $f_c$ is the acoustic slow wave frequency, $\eta$ is the solution viscosity, $S_v$ is the primary pigment surface area per unit volume of the aggregates, $\phi$ is the pigment aggregates porosity, $\rho_f$ is the solution density, and B is a constant.

It is, therefore, evident that there has been provided, in accordance with the present invention, that fully satisfies the aims and advantages hereinbefore set forth. While this invention has been described in conjunction with one embodiment thereof, it is evident that many alternatives, modifications and variations will be apparent to those skilled in the art. Accordingly, it is intended to embrace all such alternatives, modifications and variations as they fall within the spirit and broad scope of the appended claims.

What is claimed is:

1. The process of making toner comprising the steps of:

dispersing pigment aggregates and wax in a solution of particle latex constituents;

emulsifying the solution;

blending the solution;

aggregating and coalescing the solution to form toner particles;

subjecting the solution to an acoustic slow wave frequency based upon the pigment aggregates sizes in the solution to cause liquid to vibrate out of phase within solid portions of pigment aggregates to cause pore fluid motion within pigment aggregates thereby breaking up pigment aggregates in the solution, said subjecting step is applied during one or more of said steps of: said dispersing, emulsifying, blending or aggregating;

washing the toner particles; and drying the toner particles.

2. The process of claim 1 wherein said subjecting step includes the step of: determining the acoustic slow wave frequency.

3. The process in accordance with claim 2, wherein said determining step includes calculating said acoustic slow wave frequency from the following equation:

$$f_c=\eta\{S_v^2(1-\phi)^2\}/(2\pi B\ \phi^{2\rho}{}_f)$$

where system parameters $f_c$ is tile acoustic slow wave frequency, $\eta$ is the solution viscosity, $S_v$ is the primary pigment surface area per unit volume of the aggregates, $\phi$ is the pigment aggregates porosity, $\rho_f$ is the solution density, and B is a constant.

4. The process of claim 3, wherein said subjecting step includes the step of: varying the acoustic slow wave frequency in response to fluid viscosity of the solution.

5. The process of claim 2, wherein subjecting step includes the step of applying a fixed frequency from about 5 KHz to 4 MHz.

6. The process of claim 1 wherein said pigment aggregates have a substantially high cohesion between 1700nN and 200,000 nN.

7. The process of claim 1 wherein said pigment aggregates is selected from a group consisting of Blue 27 pigments.

8. The process of claim 3, further comprising employing a feedback technique to track pigment aggregate breakup as a function of time to optimum ultrasonic frequency as the system parameters change.

9. The process of claim 8, wherein said feedback technique is a signal processing technique.

10. The process of claim 8, wherein said feedback technique is an adaptive frequency determination technique.

11. The process for dispersing pigment aggregates in a solution, comprising the steps of:

providing a solution of pigment aggregates; and subjecting the solution to an acoustic slow wave frequency based upon the pigment aggregates sizes in the solution to cause liquid to vibrate out of phase within solid portions of pigment aggregates to cause pore fluid motion within pigment aggregates thereby breaking up pigment aggregates in the solution.

12. The process of claim 11, wherein said subjecting step includes the step of: determining the acoustic slow wave frequency of the pigment aggregates in the solution.

13. The process in accordance with claim 12, wherein said determining step includes calculating said acoustic slow wave frequency from the following equation:

$$f_c = \{S_v^2(1-\phi^2)\}/(2\pi B\phi^2 \rho_f)$$

where $f_c$ is the acoustic slow wave frequency, $\eta$ is the solution viscosity, $S_v$ is the primary pigment surface area per unit volume of the aggregates, $\phi$ is the pigment aggregates porosity, $\rho_f$ is the solution density, and B is a constant.

14. The process of claim 13, wherein said subjecting step includes the step of varying the acoustic slow wave frequency in response to fluid viscosity of the solution.

15. The process of claim 11, wherein said pigment aggregates, have a substantially high cohesion between 1700 nN and 200,000 nN.

16. The process of claim 11, wherein said pigment aggregates is selected from a group consisting of pigments (Yellow 108, Red 49, Blue 1:2, Red 226, Blue 15, Yellow 24, Red 216, Red 172, Red 49:2, Red 49:1, Red 178, Red 48:1, Yellow 117, Red 53:1 Red 48:3, Yellow 104, Blue 24:x, Red 52:1, Blue 63, Red 63:1, Red 57:1, Red 48:2, Red 60:1, Red 200, Blue 24, Red 67, Blue 27, Red 66, Yellow 32, Yellow 119, Red 101, and Red 102).

17. Tile process of claim 13, further comprising employing a feedback technique to track pigment aggregate breakup as a function of time to optimum ultrasonic frequency as the system parameters change.

18. The process of claim 17, wherein said feedback technique is a signal processing technique.

19. The process of claim 17, wherein said feedback technique is an adaptive frequency determination technique.

* * * * *